(12) United States Patent
Geva et al.

(10) Patent No.: US 11,315,276 B2
(45) Date of Patent: Apr. 26, 2022

(54) SYSTEM AND METHOD FOR DYNAMIC STEREOSCOPIC CALIBRATION

(71) Applicant: Corephotonics Ltd., Tel-Aviv (IL)

(72) Inventors: Nadav Geva, Tel Aviv (IL); Paz Ilan, Tel Aviv (IL); Oded Gigushinski, Herzlia (IL); Ephraim Goldenberg, Ashdod (IL); Gal Shabtay, Tel Aviv (IL)

(73) Assignee: Corephotonics Ltd., Tel Aviv (IL)

(*) Notice: Subject to any disclaimer, the term of this patent is extended or adjusted under 35 U.S.C. 154(b) by 0 days.

(21) Appl. No.: 16/975,726

(22) PCT Filed: Mar. 6, 2020

(86) PCT No.: PCT/IB2020/051948
§ 371 (c)(1),
(2) Date: Aug. 26, 2020

(87) PCT Pub. No.: WO2020/183312
PCT Pub. Date: Sep. 17, 2020

(65) Prior Publication Data
US 2021/0090281 A1 Mar. 25, 2021

Related U.S. Application Data

(60) Provisional application No. 62/816,097, filed on Mar. 9, 2019.

(51) Int. Cl.
*G06T 7/593* (2017.01)
*G06T 7/80* (2017.01)
*H04N 13/246* (2018.01)

(52) U.S. Cl.
CPC ............... *G06T 7/593* (2017.01); *G06T 7/85* (2017.01); *H04N 13/246* (2018.05)

(58) Field of Classification Search
CPC .......... G06T 7/593; G06T 7/85; H04N 13/246
(Continued)

(56) References Cited

U.S. PATENT DOCUMENTS 3,085,354 A 4/1963 Rasmussen et al.
3,584,513 A 6/1971 Gates
(Continued)

FOREIGN PATENT DOCUMENTS

CN 101276415 A 10/2008
CN 201514511 U 6/2010
(Continued)

OTHER PUBLICATIONS

Office Action in related KR patent application 2020-7024468, dated Feb. 3, 2021.
(Continued)

*Primary Examiner* — Amir Shahnami
(74) *Attorney, Agent, or Firm* — Nathan & Associates; Menachem Nathan

(57) ABSTRACT

Methods for stereo calibration of a dual-camera that includes a first camera and a second camera and system for performing such methods. In some embodiments, a method comprises obtaining optimized extrinsic and intrinsic parameters using initial intrinsic parameters and, optionally, initial extrinsic parameters of the cameras, estimating an infinity offset e using the optimized extrinsic and extrinsic parameters, and estimating a scaling factor s using the optimized extrinsic and extrinsic parameters and infinity offset parameter e, wherein the optimized extrinsic and extrinsic parameters, infinity offset e and scaling factor s are used together to provide stereo calibration that leads to improved depth estimation.

19 Claims, 8 Drawing Sheets

(58) Field of Classification Search
USPC .......................................................... 348/47
See application file for complete search history.

(56) References Cited

U.S. PATENT DOCUMENTS

| | | |
|---|---|---|
| 3,941,001 A | 3/1976 | LaSarge |
| 4,199,785 A | 4/1980 | McCullough et al. |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,657,402 A | 8/1997 | Bender et al. |
| 5,682,198 A | 10/1997 | Katayama et al. |
| 5,768,443 A | 6/1998 | Michael et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,201,533 B1 | 3/2001 | Rosenberg et al. |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0177025 A1 | 8/2007 | Kopet et al. |
| 2007/0188653 A1 | 8/2007 | Pollock et al. |
| 2007/0189386 A1 | 8/2007 | Imagawa et al. |

(56) References Cited

U.S. PATENT DOCUMENTS

| | | |
|---|---|---|
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0123937 A1* | 5/2008 | Arias Estrada ......... G06T 7/593 382/154 |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0196001 A1 | 8/2010 | Ryynänen et al. |
| 2010/0238327 A1 | 9/2010 | Griffith et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0155176 A1 | 6/2013 | Paripally et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0124059 A1 | 5/2015 | Georgiev et al. |
| 2015/0138381 A1 | 5/2015 | Ahn |
| 2015/0145965 A1 | 5/2015 | Livyatan et al. |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0070731 A1 | 3/2017 | Darling et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0287169 A1* | 10/2017 | Garcia ...................... G06T 7/85 |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0198897 A1 | 7/2018 | Tang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2018/0329281 A1 | 11/2018 | Ye |
| 2019/0121103 A1 | 4/2019 | Bachar et al. |
| 2020/0342652 A1* | 10/2020 | Rowell ................ G06K 9/6256 |

(56) References Cited

U.S. PATENT DOCUMENTS

| | | | | |
|---|---|---|---|---|
| 2021/0006725 | A1* | 1/2021 | Niezrecki | B64C 39/024 |
| 2021/0156678 | A1* | 5/2021 | Grauzinis | G01B 11/2513 |

FOREIGN PATENT DOCUMENTS

| | | | |
|---|---|---|---|
| CN | 102739949 | A | 10/2012 |
| CN | 103024272 | A | 4/2013 |
| CN | 103841404 | A | 6/2014 |
| EP | 1536633 | A1 | 6/2005 |
| EP | 1780567 | A1 | 5/2007 |
| EP | 2523450 | A1 | 11/2012 |
| JP | S59191146 | A | 10/1984 |
| JP | 04211230 | A | 8/1992 |
| JP | H07318864 | A | 12/1995 |
| JP | 08271976 | A | 10/1996 |
| JP | 2002010276 | A | 1/2002 |
| JP | 2003298920 | A | 10/2003 |
| JP | 2004133054 | A | 4/2004 |
| JP | 2004245982 | A | 9/2004 |
| JP | 2005099265 | A | 4/2005 |
| JP | 2006238325 | A | 9/2006 |
| JP | 2007228006 | A | 9/2007 |
| JP | 2007306282 | A | 11/2007 |
| JP | 2008076485 | A | 4/2008 |
| JP | 2010204341 | A | 9/2010 |
| JP | 2011085666 | A | 4/2011 |
| JP | 2012132739 | A | 7/2012 |
| JP | 2013106289 | A | 5/2013 |
| JP | 2016105577 | A | 6/2016 |
| KR | 20070005946 | A | 1/2007 |
| KR | 20090058229 | A | 6/2009 |
| KR | 20100008936 | A | 1/2010 |
| KR | 20140014787 | A | 2/2014 |
| KR | 101477178 | B1 | 12/2014 |
| KR | 20140144126 | A | 12/2014 |
| KR | 20150118012 | A | 10/2015 |
| WO | 2000027131 | A2 | 5/2000 |
| WO | 2004084542 | A1 | 9/2004 |
| WO | 2006008805 | A1 | 1/2006 |
| WO | 2010122841 | A1 | 10/2010 |
| WO | 2014072818 | A2 | 5/2014 |
| WO | 2017025822 | A1 | 2/2017 |
| WO | 2017037688 | A1 | 3/2017 |
| WO | 2018130898 | A1 | 7/2018 |

OTHER PUBLICATIONS

Office Action in related EP patent application 20770621.9, dated Jun. 25, 2021.
Statistical Modeling and Performance Characterization of a Real-Time Dual Camera Surveillance System, Greienhagen et al., Publisher: IEEE, 2000, 8 pages.
A 3MPixel Multi-Aperture Image Sensor with 0.7µm Pixels in 0.11µm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: EUROGRAPHICS, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.
International Search Report and Written Opinion in related PCT application PCT/IB2020/051948, dated Jul. 24, 2020.

\* cited by examiner

SYSTEM AND METHOD FOR DYNAMIC STEREOSCOPIC CALIBRATION

CROSS REFERENCE TO RELATED APPLICATIONS

This application is a 371 application from international patent application PCT/IB2020/051948 filed Mar. 6, 2020, and is related to and claims priority from U.S. Provisional Patent Application No. 62/816,097 filed on Mar. 9, 2019, which is expressly incorporated herein by reference in its entirety.

FIELD

Embodiments disclosed herein relate in general to optical instrument calibration such as in stereoscopic digital cameras, and more particularly to stereoscopic calibration in dual-aperture digital cameras ("dual-cameras") that are configured to be incorporated in vehicles as part of a driver assistance system.

BACKGROUND

Definitions

"Dynamic stereoscopic calibration"—estimation of "stereo parameters" of a stereo (dual) camera without a known calibration chart, while the stereo camera is in use, with or without it being moved.

"Stereo parameters": stereo camera parameters that are required to be calibrated in order to produce a high precision depth map, comprising intrinsic parameters (for each camera) and extrinsic parameters (for each camera pair).

"Intrinsic parameters": parameters that include focal length, optical axis in X and Y axes and lens distortion coefficients.

"Extrinsic parameters": parameters that include three relative (between two cameras) angles (Yaw, Pitch and Roll) and three offsets (Tx, Ty and Tz).

"Disparity axis": the axis of disparity (in our XYZ coordinate system, X if cameras are placed horizontally).

"Non-disparity axis": the axis perpendicular to the disparity axis (in our XYZ coordinate system, Y if cameras are placed horizontally).

Advanced Driver-Assistance Systems (ADASs) are known. An ADAS included in vehicles combine sensors and algorithms to understand the vehicle's environment so that a driver of the vehicle can receive assistance or be warned of hazards. ADASs rely on computer vision, which plays a pivotal role in acquiring, processing, analyzing, and understanding the environment and surrounding objects. Often, ADASs use multi-camera systems with two or more cameras or "camera modules".

FIG. 1A shows top views of vehicles having multi-camera systems in various arrangements. The term "vehicle" may apply to any vehicle including (but not limited) to a car, a motorcycle, a truck, a bus, an airplane, a bicycle, etc. In (a) a dual-camera system includes two cameras 102 and 104 arranged close to each other along the X axis. Here, X the disparity axis is X and the a non-disparity axis is Y. The two cameras may share a common housing. In (b) two cameras 106 and 108 are placed along the Y axis at a greater distance from each other than in (a). In (c), two cameras 110 and 112 are arranged along the X axis as disparity axis. In (d) there are four cameras 114, 116, 118 and 120, in (e) there are three cameras 122, 124 and 126 and in (f) there are two cameras 128 and 130, arranged as shown. The cameras are not limited to a particular type of camera. In an example, the cameras may be identical. In an example, cameras may differ in one or more of the following parameters: focal length, sensor size, pixel size and/or pitch, and/or f-number (f/#). In an example, a camera may be a color camera, a black and white camera or an infrared (IR) sensitive camera. In an example, a multi-camera system may additionally include infrared projectors, fiber optics, lasers, sensors, or a combination thereof (not shown).

Accurate depth maps of the environment are necessary for the computer vision to operate properly. A depth map is an image or image channel that contains information relating to the distance of surfaces of scene objects from a viewpoint.

A common solution for creating depth maps of the environment is using a stereoscopic camera or a dual-camera (a camera comprised of two sub-cameras) for imaging and estimating the distance of objects from the camera. Using a dual-camera for depth map creation depends on calculating disparity of the pixels of various objects in the field of view (FOV). In order to accurately translate disparity values in pixels to real-world depth in meters, there is a need for accurate camera stereo calibration.

Calibration of a stereo (or dual) camera system includes analyzing acquired data to assess the accuracy of the intrinsic and extrinsic parameters and adjusting accordingly.

Assuming all intrinsic and extrinsic parameters are known, an object's distance (or "depth") Z within the FOV of a vehicle dual-camera system can be calculated and/or estimated using equation 1:

$$Z = \frac{f * B}{D * ps} \tag{1}$$

where f is focal length, B is baseline, D is disparity in pixels, and "ps" is pixel size.

However, in practice, factory and dynamic calibration procedures suffer from estimation errors in intrinsic and/or extrinsic parameters that can be expressed in a revised equation 1':

$$Z = \frac{s * f * B}{(D + e) * ps} \tag{1'}$$

where "s" is an unknown scaling factor, an accumulative error in focal length estimation and translation along a disparity axis (i.e. Tx), and "e" represents a "infinity disparity error" or "infinity offset" that encapsulates the estimation error in optical axis location for both left ("L") and right ("R") cameras (intrinsic parameters) as well as estimation errors in the rotation along the "non-disparity axis", extrinsic parameters).

FIG. 1B shows an example of the possible discrepancies in depth estimation for two exemplary errors in e. Assume e is estimated with 0.5 pixels error or 1 pixels error. The figure shows a graph for a stereo system with f=6 mm, ps=0.0042 mm and B=120 mm (see Eq. 1'). The graph depicts diverging error percentages based on distance comparing a 0.5-pixel error to a 1-pixel error ("e" in equation 1'). The effect of even half a pixel error on the depth estimation is dramatic especially in high distances.

Manual stereo calibrations before installation of stereo or dual-cameras in a host vehicle are difficult. Maintaining a pre-installation stereo calibration is difficult, due to changes during camera lifecycle. Such changes may include (but are not limited to) heat expansions, vibrations and mechanical hits, which cause some of the calibration parameters to change over time. Calibrating a stereo (or dual) camera mounted behind a windshield is further complicated since the windshield may affect some of the calibration parameters of the stereo camera, e.g. by distorting the perspective or viewing angles of the camera. Therefore, the calibration may be performed only after installing the cameras in the host vehicle.

There have been a number of attempts to solve the stereoscopic camera calibration issue, however, none have been able to devise a solution that meets the needs of industry. Some of these solutions attempt to run structure from motion (SFM) algorithms. SFM uses complicated algorithms that track moving features in successive images to determine its structural information, then the image frames are processed to compute a depth map. This solution fails to meet the needs of industry because running these processes is inordinately difficult and computationally demanding for the cameras mounted in a moving car.

There is therefore a need for, and it would be advantageous to have dynamic stereoscopic calibration systems and methods that overcome the deficiencies in existing systems and methods that use SFM technology.

SUMMARY

In various embodiments, there are provided methods for dynamic stereoscopic calibration of a stereo digital camera including a first camera and a second camera, each camera having intrinsic parameters and extrinsic parameters, the method comprising: obtaining optimized extrinsic and intrinsic parameters based on input intrinsic parameters, and, optionally, input extrinsic parameters; estimating an offset parameter e using the optimized extrinsic and extrinsic parameters; estimating a scaling factor s using the optimized extrinsic and extrinsic parameters and estimated offset parameter e; and using the optimized extrinsic and extrinsic parameters, infinity offset e and scaling factor s to provide stereo calibration that leads to improved depth estimation.

In certain embodiments, a method for dynamic stereoscopic calibration disclosed herein may include selecting initial values for the intrinsic and/or extrinsic parameters of the first camera and initial values for the intrinsic parameters of the second camera. The initial values may be derived for example from the design of the camera ("nominal" values), from factory settings if calibration for each camera was done or from previous usage of the camera, etc. The calibration of the intrinsic and/or extrinsic parameters may include capturing at least one image from the first camera and at least one image from the second camera, matching corresponding points on the at least one image from the first camera to corresponding points on the at least one image from the second camera, and calculating optimized intrinsic and extrinsic parameters of the first camera and the second camera using epipolar geometry. This provides an initial calibration of the first camera and of the second camera with aligned epipolar lines. The various selections, calculations, processes etc. may be performed using a processor, and data/results of the processing may be stored in a memory.

Further actions to estimate offset parameter e and scaling factor s may include obtaining, at least two image pairs based upon images received from the first camera and the second camera, wherein the at least two image pairs are images sequentially taken via the first camera and the second camera, and wherein each pair of images (one from each camera) needs to be taken simultaneously; matching corresponding points on the at least two image pairs; and generating a disparity map, wherein the disparity map includes pixels matched from the corresponding points on the at least two image pairs, wherein pixels with constant disparity are identified as pixels at infinity distance.

In certain embodiments, the method includes storing the at least two image pairs in a memory.

In certain embodiments, the number of at least two image pairs captured from the first camera and the at least two image pairs captured from the second camera is determined by a processor.

In certain embodiments, the processor stops receiving at least two image pairs from the first camera and the second camera once a full FOV is captured.

In certain embodiments, the stereo digital camera is installed in a vehicle.

In certain embodiments, the stereo digital camera is configured to be incorporated in a vehicle as part of a driver assistance system.

In certain embodiments, the step of setting the initial intrinsic parameters of the first camera and the initial intrinsic parameters of the second camera includes a processor performing an initial guess for the intrinsic parameters for said stereo digital camera.

In certain embodiments, the step of selecting initial intrinsic parameters include factory calibration.

In certain embodiments, the selecting initial intrinsic parameters includes independent estimation from bundle adjustment.

In certain embodiments, selecting initial intrinsic parameters includes independent estimation from structure from motion (SFM).

In certain embodiments, the at least one image from the first camera and at least one image from the second camera are stored in memory.

In certain embodiments, the corresponding points on the at least one image from the first camera and the second camera are stored in memory.

In certain embodiments, the disparity map is stored in memory.

In certain embodiments, the steps for calibrating external and internal parameters are repeated to obtain a full FOV.

In certain embodiments, the steps for calibrating depth are repeated to obtain a full FOV.

In certain embodiments, the intrinsic parameters are selected from a group consisting of focal length, image distortion and optical axis.

In certain embodiments, the extrinsic parameters describe the translation and rotation of the one camera relative to the other.

In certain embodiments, the method includes using infinity disparity to compensate for estimation errors.

In certain embodiments, the method includes identifying moving objects in the at least two image pairs.

In certain embodiments, the method includes removing said moving objects from the disparity map.

In certain embodiments, the moving objects are identified using computer vision.

In certain embodiments, the moving objects are identified using high disparity values.

In certain embodiments, the method includes repeating the steps of the above referenced steps multiple times and averaging the results.

In an embodiment there is provided a method for dynamic stereo camera calibration, comprising obtaining at least two image pairs from a dual-camera, performing local registration of the at least two image pairs and obtaining a registration map, finding a minimal disparity in the registration map, calculating a minimum disparity value, defining a global minimal disparity value, and calibrating the dual-camera using the global minimal disparity value.

BRIEF DESCRIPTION OF THE DRAWINGS

Some embodiments herein described, by way of example only, with reference to the accompanying drawings. With specific reference now to the drawings in detail, it is stressed that the particulars shown are by way of example and for purposes of illustrative discussion of embodiments of the application. In this regard, the description taken with the drawings makes apparent to those skilled in the art how embodiments of the application may be practiced. In the drawings.

DETAILED DESCRIPTION

Embodiments disclosed herein describe methods of dynamic stereo calibration of the intrinsic and extrinsic parameters that include estimation of the "additional" parameters of equation 1', scaling factor s and disparity error e. While all the parameters in the equation may be estimated in a factory (where the dual-camera is assembled and/or where the vehicle is assembled), the parameters may change during the life cycle of the camera due to a number of factors, including (but not limited to) shift between sub-cameras, tilt between sub-cameras, shift in each sub-camera between its lens and the sensor, change in the camera focal length, etc.

The present application efficiently calibrates the camera parameters to ensure that the camera is viewing its surroundings properly and is able to effectively calculate distance.

Figure 1A:
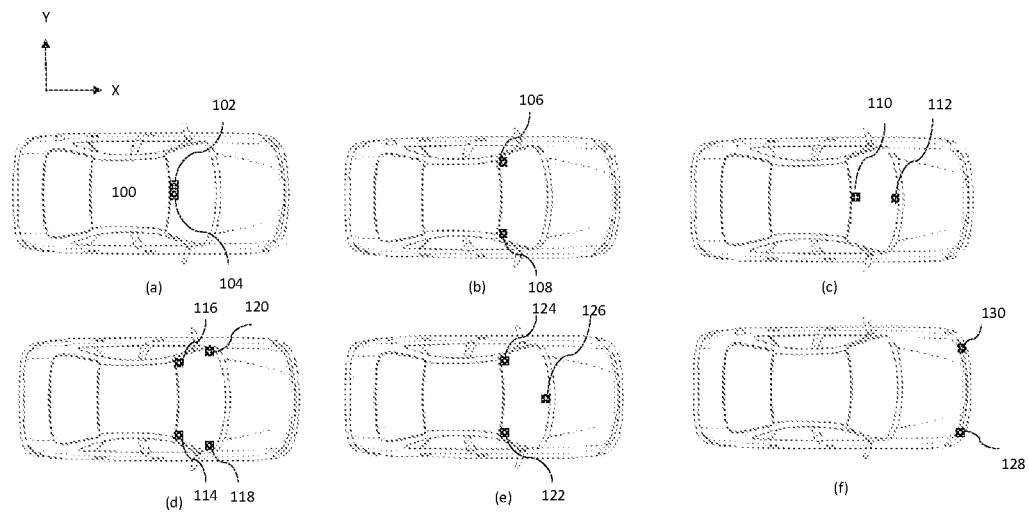
FIG. 1A shows top views of vehicles having multi-camera systems in various arrangements.
Figure 1B:
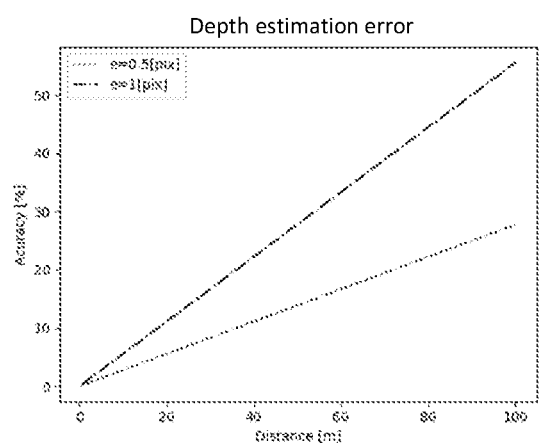
FIG. 1B shows an example of possible discrepancies in depth estimation due to infinity disparity errors.
Figure 2A:
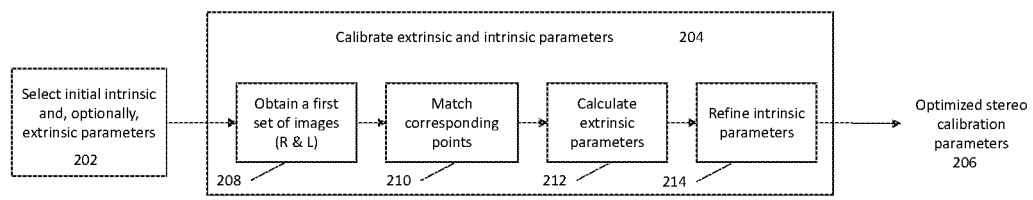
FIG. 2A shows a flowchart describing an exemplary embodiment for calibrating stereo parameters.

FIG. 2A shows a flowchart describing an embodiment of an exemplary method for calibrating a stereo camera's intrinsic and extrinsic parameters. In step 202, initial extrinsic and/or intrinsic parameters are selected for both cameras. An initial calibration parameter can be estimated from factory settings (all the nominal values known for the stereo camera—focal length, lens distortion, optical axis, base line, etc.), through independent estimation from bundle adjustment, structure from motion, previous calibration parameters, etc. Intrinsic and (optionally) extrinsic parameters are calibrated in step 204. The calibration includes obtaining a first set of R-L images in sub-step 208 and matching corresponding points in sub-step 210, using a feature extraction method on L and R images separately and finding the corresponding feature of L image in the right image. A minimum of four pairs of points are needed, but normally a few hundred pairs of points are used. The calibration continues with calculating extrinsic parameters in sub-step 212, using for example, Essential Metrix estimation and decomposition, estimating the 3 angles (Yaw, Pitch, Roll) and the translation up to unknown scale (three offsets) Tx, Ty, Tz. The intrinsic parameters are then refined in sub-step 214 using an optimization technique (i.e. gradient standard) to minimize the non-disparity axis error over selected intrinsic parameters. The refinement includes calculating the difference in image location for each matched feature point along the non-disparity axis (NDA). The goal of the optimization is to minimize the sum of absolute NDA over all matched features from all the images. In a perfectly calibrated stereo system, the sum of absolute NDA will converge to zero. For practical cases and for example, one can set a stop condition that the minimized average absolute NDA be within a "delta" value from zero. For example, the delta value may be 0.1 pixels. Using another stop condition and example, the stop condition may be a maximum absolute NDA smaller than 0.25 pixels.

The output of step 204 is optimized stereo calibration (i.e. intrinsic and extrinsic) parameters 206, i.e. a calibrated dual-camera output that allows rectifying the camera system's output into a pair of images having parallel epipolar lines. The optimized stereo calibration parameters are then used in estimating infinity offset e and scaling factor s.

This optimization problem can be solved with a number of optimization techniques such as gradient decent. Intrinsic parameters refined in this sub-step include focal length ratio between left and right cameras, lens distortion coefficients and "non-disparity" optical axis differences.

Figure 2B:
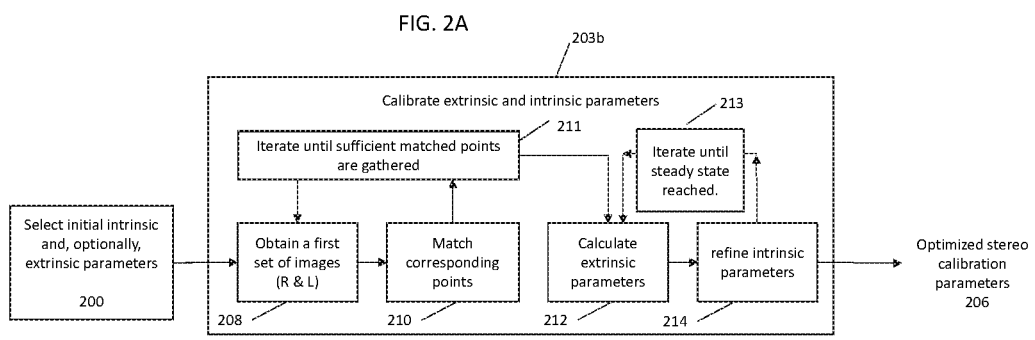
FIG. 2B shows a flowchart describing an exemplary embodiment for calibrating stereo parameters.

FIG. 2B shows a flowchart describing another embodiment of an exemplary method for calibrating a stereo camera's intrinsic and extrinsic parameters. This embodiment is similar to that of FIG. 2A, with the following changes:

1. Iterate steps 208 and 210 until sufficient matched points are gathered: this is an iterative process performed in step 211 until the matched features are evenly spread across the camera's FOV and distance from the camera, for example by having 5 corresponding points in a 3D box of $N°×N°×FOV\_P_{disp}$ (N~1/20 FOV P~1/10 disparity range measured by pixels).

2. Iterate steps 212 and 214 until a stable state is reached: this is an iterative process performed in step 213. After intrinsic parameters were refined in step 214 recalculate extrinsic parameters in step 212 and refine until steady state is reached either in the parameter value or in the sum of absolute NDA.

Figure 3A:
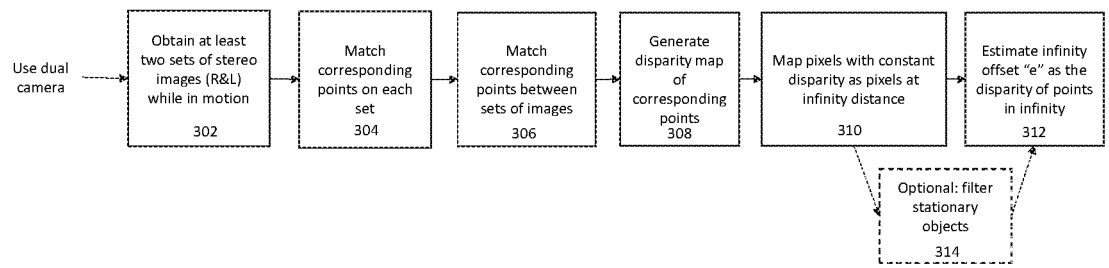
FIG. 3A shows a flowchart describing an exemplary embodiment for infinity correction in a method disclosed herein.

FIG. 3A shows a flowchart describing an exemplary embodiment of a method for infinity correction (i.e. for estimating infinity offset e in equation 1'). The method is implemented using a dual-camera in a dynamic environment (e.g. while driving in a given vehicle). At least two sets of stereo images (i.e. four images, 2L and 2R) are obtained while in motion in step 302. Corresponding points in each set of L and R images are matched in step 304. Corresponding points between images in the two sets are matched in step 306. In contrast with the matching of left vs. right (L-R) features performed with a single set of images, in step 306 the match is left vs. left (L-L) and/or right vs. right (R-R) in various car positions (i.e. of a same point in different sets of stereo images obtained in step 304). A disparity map of corresponding points is generated in step 308. The generation of the disparity map includes calculating the disparity value in the two time frames for all features matched in both 304 and 306. This step must be done on rectified points, either by rectifying the input images (before step 302) or just rectifying the corresponding feature (before step 308). Rectification parameters (i.e. stereo parameters) are then obtained (estimated) in output 206. In certain embodiments, when "disparity" is mentioned, it is assumed either rectified images or rectified image coordinates are used. In step 310 pixels with constant disparity over different time steps (while the vehicle was in motion) are labeled as "infinity" distance. The infinity offset e, defined as the disparity of points at infinity is then estimated in step 312. In certain embodiments, this is done by averaging the disparity of all infinity labeled pixels. In certain embodiments, just one infinity labeled pixel is enough, although in practice a few dozen will be used.

Optionally, a step 314 of filtering stationary objects may be performed before estimating infinity offset e step 312. Objects that are stationary to the dual-camera and/or the given vehicle (e.g., another vehicle moving with the same velocity and in the same direction as the given vehicle) will have constant disparity (same as infinity pixels) and therefore should be filtered from the infinity offset estimation. The filtering may include for example thresholding pixels with large enough disparity (infinite disparity will be close to zero) or detecting cars/motorcycle/bikes by machine learning.

Figure 3B:
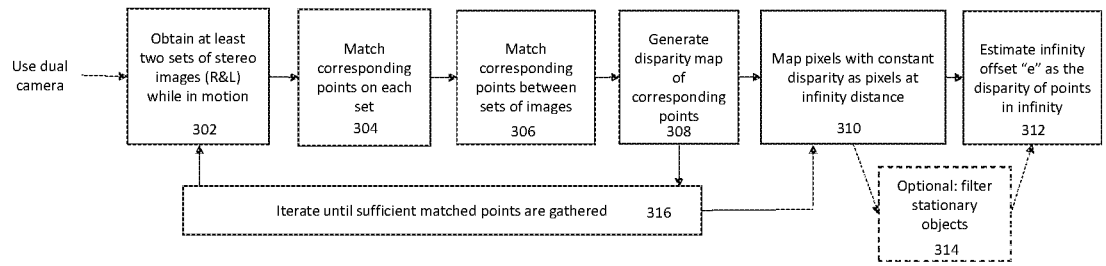
FIG. 3B shows a flowchart describing an exemplary embodiment for infinity correction in a method disclosed herein.

FIG. 3B shows a flowchart describing an exemplary embodiment of another method for infinity correction. This embodiments is similar to the one in FIG. 3A, except for an added loop (iteration) step 316, which iterates steps 302 to 308 to ensure that estimating infinity offset step 312 has a sufficient number of infinity pixels (in general more infinity labeled pixels are desired). i.e. reaches a steady state of infinity offset estimation.

Figure 4A:
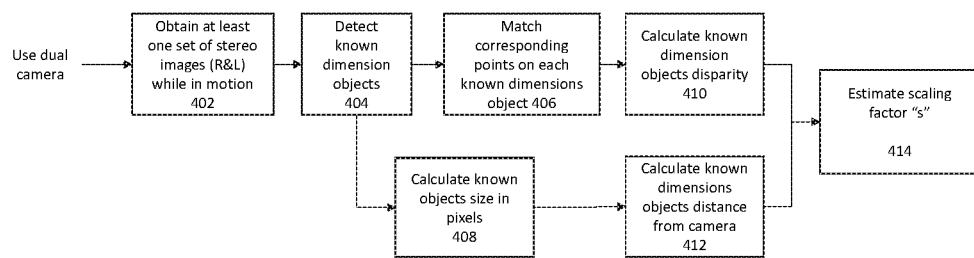
FIG. 4A shows a flowchart describing an exemplary embodiment of a method for estimating object scale in a method disclosed herein.

FIG. 4A shows a flowchart describing an exemplary embodiment of a method for estimating scale (estimating scaling factor s in equation 1'). As in the estimation of e, the method is implemented using a dual-camera in a dynamic environment (e.g. while driving in a given vehicle). At least one set of stereo images is obtained in step 402 while in motion. Objects of known dimensions (OKDs) are detected in step 404 using a detection algorithms, by finding an OKD in one of the acquired images. We define a "detected OKD" as $X_{OKD}$. $X_{OKD}$ may be for example a license plate length, a traffic speed sign diameter, or any other objects that are identical to each other and/or have constant dimensions in a given place (city, state, country, continent, etc.). The corresponding points of each $X_{OKD}$ are matched in the corresponding stereo image in step 406 and the size of known objects in pixels is calculated in step 408. The size calculation may include using a segmentation algorithm to find all pixels associated with the object and to calculate its dimensions $P_{OKD}$ (e.g. license plate length or traffic speed sign diameter). The disparity of the known dimension object is calculated in step 410 using (as in step 308) rectified images or rectified image coordinates. The distance of the $X_{OKD}$ from the dual-camera is calculated in step 412 using for example camera focal length and object pixel size as Distance=focal_length*$X_{OKD}$/$P_{OKD}$. Scaling factor s is then estimated in step 414 using equation 1' and the value of e from step 312.

In some embodiments, one set of images is needed since object dimensions may be known. In other embodiments, many sets of images can be obtained, preferably a thousand image sets, however fewer can be utilized effectively as well. A plurality of output estimations for s may be averages over many measurements.

Figure 4B:
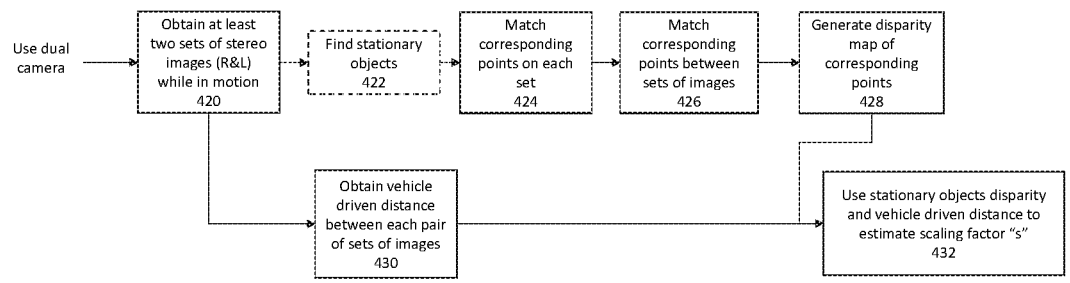
FIG. 4B shows a flowchart describing another exemplary embodiment of a method for estimating object scale in a method disclosed herein.

FIG. 4B shows a flowchart describing another exemplary embodiment of a method for estimating scaling factor s. At least two sets of stereo (L and R) images are obtained while in motion in step 420. Stationary objects relative to the ground are found (detected) (e.g. by a detection algorithm for traffic sign/traffic lights, buildings, and/or cross-roads) in step 422. Corresponding points in each set are matched in step 424 in a manner similar to that in step 304. Corresponding points between images in the two sets are matched in step 426 in a manner similar to that in step 306. A disparity map of corresponding points is generated in step 428 in a manner similar to that in step 308. A distance AZ driven by the vehicle between the taking of each pair of sets of images is obtained (measured) in step 430, e.g. using the vehicle's velocity meter/GPS/external inertial measurement unit. The disparity of the stationary objects disparity and the driven distance are then used to estimate scaling factor s in step 432, using equation 1' and equation 2 below (after e has been estimated in step 312).

$$\Delta Z = Z_{i+1} - Z_i = \frac{s*f*B}{ps}\left(\frac{1}{D_{i+1}+e} - \frac{1}{D_i+e}\right) \quad (2)$$

Furthermore, s can be easily extracted and averaged across many samples.

In an alternate embodiment, a dual-camera system obtains a set of two images from the dual-camera. The system performs local registration of the set of two images and obtains a registration map. The system proceeds by finding the minimal disparity in the registration map, calculating the minimum of minimum disparity value, defining a global minimum disparity value, and calibrating the dual-camera using the global minimum disparity.

Image registration is the process of transforming different sets of data into one coordinate system. The data may be multiple photographs, data from different sensors, times, depths, or viewpoints.

Figure 5:
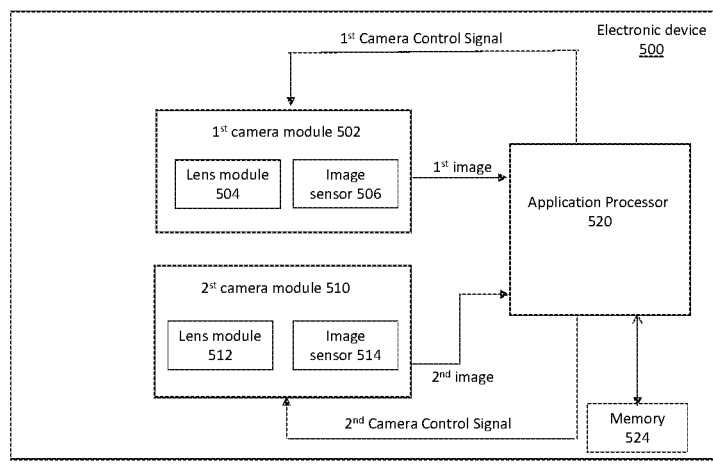
FIG. 5 describes a system installed in a vehicle and used for performing a method disclosed herein.

FIG. 5 shows schematically an embodiment of an electronic device numbered 500 including a dual-aperture camera (as a particular example of a multi-aperture camera that can have more than two camera modules). Electronic device 500 comprises a first camera module 502 that includes a first lens module 504 that forms a first image recorded by a first image sensor 506 and a second camera module 510 that includes a second lens module 512 that forms an image recorded by a second image sensor 514. The two camera modules may be identical on different. For example, the two cameras may have similar or different FOVs. The cameras may be of different type, for example having image sensors sensitive to the visible (VIS) wavelength range or to the infrared (IR) or other wavelength range, time of flight (TOF) cameras, etc. Electronic device 500 may further comprise a processing unit or application processor (AP) 520. In some embodiments, initial or previous calibration data may be stored in memory 524 of the electronic device 500.

In use, a processing unit such as AP 520 may receive respective first and second image data (or $1^{st}$ and $2^{nd}$ images) from camera modules 502 and 510 and may supply camera control signals to camera modules 502 and 510 to ensure that both images are acquired simultaneously. After receiving at least one image from each camera, AP 520 will execute the processes described in FIGS. 2A, 2B, 3A, 3B and 4A, 4B. The final outcome will be updated stereo calibration parameters that may be stored in the memory unit 524, for further use.

It should be understood that where the claims or specification refer to "a" or "an" element, such reference is not to be construed as there being only one of that element.

Methods described herein can be implemented to calibrate camera parameters as often as every time a user turns on a car or multiple times per use or scheduled calibration periods preset by the manufacturer or user prompt, to a single calibration upon leaving the factory, or a combination thereof. The present application does not require network or cloud access however can benefit from having such access for storing or processing data, for example storage of images, accessing dimension data, remote processing, etc.

The disclosed embodiments are capable of processing sets of image pairs independently, providing better results than the standard techniques. The disclosed methods can be done without a strict sequential requirement, unlike SFM, which requires a sequence of 20-100 image pairs. Further, they are unique when compared with other known processes and solutions in that they (1) reduce the computational demand on the system, and (2) reduce the number of images needed to calibrate the parameters.

Unless otherwise defined, all technical or/and scientific terms used herein have the same meaning as commonly understood by one of ordinary skill in the art to which the application pertains.

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

What is claimed is:

1. A method for stereo calibration of a dual-camera that includes a first camera and a second camera, the method comprising:
   a) obtaining optimized extrinsic and intrinsic parameters using initial intrinsic parameters and, optionally, initial extrinsic parameters, by obtaining with the dual-camera a set of left and right images, matching corresponding points in the left and right images to obtain matched feature points, calculating extrinsic parameters, and refining the initial intrinsic parameters based on the matched feature points;
   b) estimating an infinity offset e using the optimized extrinsic and extrinsic parameters;
   c) estimating a scaling factor s using the optimized extrinsic and extrinsic parameters and infinity offset e; and
   d) using the optimized extrinsic and extrinsic parameters, infinity offset e and scaling factor s to provide stereo calibration that leads to improved depth estimation.

2. The method of claim 1, wherein the stereo calibration includes dynamic stereo calibration.

3. The method of claim 2, wherein the dynamic stereo calibration is performed in a moving vehicle that includes the dual-camera.

4. The method of claim 1, wherein the initial intrinsic parameters include nominal values of intrinsic parameters of the first and second cameras.

5. The method of claim 1, wherein the initial intrinsic parameters include factory calibrated initial intrinsic parameters of the first and second cameras.

6. The method of claim 1, wherein the initial intrinsic parameters include initial intrinsic parameters of the first and second cameras estimated independently from bundle adjustment.

7. The method of claim 1, wherein the initial intrinsic parameters include initial intrinsic parameters of the first and second cameras estimated independently from structure from motion.

8. The method of claim 1, further comprising iterating between the calculating extrinsic parameters and the matching corresponding points in the left and right images until sufficient matched points are gathered.

9. The method of claim 1, wherein the refining the initial intrinsic parameters includes calculating a difference in image location for each matched feature point along a non-disparity axis and wherein the obtaining optimized intrinsic parameters include fulfilling a stop condition.

10. The method of claim 8, wherein the refining the initial intrinsic parameters includes calculating a difference in image location for each matched feature point along a non-disparity axis and wherein the obtaining optimized intrinsic parameters include fulfilling a stop condition.

11. A method for stereo calibration of a dual-camera that includes a first camera and a second camera, comprising:
    obtaining optimized extrinsic and intrinsic parameters using initial intrinsic parameters and, optionally, initial extrinsic parameters by obtaining dynamically at least two sets of stereo images, wherein each stereo image set includes a left image and a right image, matching corresponding points in left and right images of each set, matching corresponding points in, respectively, left images and right images of at least two sets, generating a disparity map by calculating disparity values in the two time frames for all features matched in same sets and between sets, labeling pixels with constant disparity over different time steps as respective points at infinity and estimating infinity offset e, from a respective disparity of the points at infinity,
    estimating an infinity offset e using the optimized extrinsic and extrinsic parameters;
    estimating a scaling factor s using the optimized extrinsic and extrinsic parameters and infinity offset e; and
    using the optimized extrinsic and extrinsic parameters, infinity offset e and scaling factor s to provide stereo calibration that leads to improved depth estimation.

12. A method for stereo calibration of a dual-camera that includes a first camera and a second camera, the method comprising:
    obtaining optimized extrinsic and intrinsic parameters using initial intrinsic parameters and, optionally, initial extrinsic parameters,
    estimating an infinity offset e using the optimized extrinsic and extrinsic parameters;
    estimating a scaling factor s using the optimized extrinsic and extrinsic parameters and infinity offset e by obtaining dynamically at least one set of stereo images, detecting in the set at least one object of known dimensions (OKD) to obtain a detected OKD marked $X_{OKD}$, matching corresponding points in $X_{OKD}$, calculating a size of $X_{OKD}$, calculating a disparity of $X_{OKD}$, calculating a distance of $X_{OKD}$ from the dual-camera and estimating scaling factor s using the size, the disparity and the distance; and using the optimized extrinsic and extrinsic parameters, infinity offset e and scaling factor s to provide stereo calibration that leads to improved depth estimation.

13. The method of claim 2, wherein the estimating scaling factor s using the optimized extrinsic and extrinsic parameters and infinity offset e includes obtaining dynamically at least one set of stereo images, detecting in the set at least one object of known dimensions (OKD) to obtain a detected OKD marked $X_{OKD}$, matching corresponding points in $X_{OKD}$, calculating a size of $X_{OKD}$, calculating a disparity of $X_{OKD}$, calculating a distance of $X_{OKD}$ from the dual-camera and estimating scaling factor s using the size, the disparity and the distance.

14. The method of claim 3, wherein the estimating scaling factor s using the optimized extrinsic and extrinsic parameters and infinity offset e includes obtaining dynamically at least one set of stereo images, detecting in the set at least one object of known dimensions (OKD) to obtain a detected OKD marked $X_{OKD}$, matching corresponding points in $X_{OKD}$, calculating a size of $X_{OKD}$, calculating a disparity of $X_{OKD}$, calculating a distance of $X_{OKD}$ from the dual-camera and estimating scaling factor s using the size, the disparity and the distance.

15. The method of claim 11, wherein the estimating scaling factor s using the optimized extrinsic and extrinsic parameters and infinity offset e includes obtaining dynamically at least one set of stereo images, detecting in the set at least one object of known dimensions (OKD) to obtain a detected OKD marked $X_{OKD}$, matching corresponding points in $X_{OKD}$, calculating a size of $X_{OKD}$, calculating a disparity of $X_{OKD}$, calculating a distance of $X_{OKD}$ from the dual-camera and estimating scaling factor s using the size, the disparity and the distance.

16. A method for stereo calibration of a dual-camera that includes a first camera and a second camera, the method comprising:
    obtaining optimized extrinsic and intrinsic parameters using initial intrinsic parameters and, optionally, initial extrinsic parameters,
    estimating an infinity offset e using the optimized extrinsic and extrinsic parameters;
    estimating a scaling factor s using the optimized extrinsic and extrinsic parameters and infinity offset e by estimating scaling factor s using the optimized extrinsic and extrinsic parameters and infinity offset e includes obtaining dynamically at least two sets of stereo images, detecting in the sets at least one stationary object $X_{OS}$, matching corresponding points in $X_{OS}$ to obtain a disparity, obtaining a distance driven between the obtaining of the at least two sets, and estimating scaling factor s using the disparity and the distance; and
    using the optimized extrinsic and extrinsic parameters, infinity offset e and scaling factor s to provide stereo calibration that leads to improved depth estimation.

17. The method of claim 2, wherein the estimating scaling factor s using the optimized extrinsic and extrinsic parameters and infinity offset e includes obtaining dynamically at least two sets of stereo images, detecting in the sets at least one stationary object $X_{OS}$, matching corresponding points in $X_{OS}$ to obtain a disparity, obtaining a distance driven between the obtaining of the at least two sets, and estimating scaling factor s using the disparity and the distance.

18. The method of claim 3, wherein the estimating scaling factor s using the optimized extrinsic and extrinsic parameters and infinity offset e includes obtaining dynamically at least two sets of stereo images, detecting in the sets at least one stationary object $X_{OS}$, matching corresponding points in $X_{OS}$ to obtain a disparity, obtaining a distance driven between the obtaining of the at least two sets, and estimating scaling factor s using the disparity and the distance.

19. The method of claim 11, wherein the estimating scaling factor s using the optimized extrinsic and extrinsic parameters and infinity offset e includes obtaining dynamically at least two sets of stereo images, detecting in the sets at least one stationary object $X_{OS}$, matching corresponding points in $X_{OS}$ to obtain a disparity, obtaining a distance driven between the obtaining of the at least two sets, and estimating scaling factor s using the disparity and the distance.

* * * * *